US006705531B1

(12) United States Patent
Norton (10) Patent No.: US 6,705,531 B1
(45) Date of Patent: Mar. 16, 2004

(54) SMART CARD SYSTEM, APPARATUS AND METHOD WITH ALTERNATE PLACEMENT OF CONTACT MODULE

(75) Inventor: Stephen P. Norton, Conyers, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 147 days.

(21) Appl. No.: 09/897,235

(22) Filed: Jul. 2, 2001

(51) Int. Cl.$^7$ ................................................ G06K 19/00
(52) U.S. Cl. ........................ 235/492; 235/487; 235/375; 235/384; 235/451
(58) Field of Search ................................ 235/492, 487, 235/384, 451, 375

(56) References Cited

U.S. PATENT DOCUMENTS

| | | | |
|---|---|---|---|
| 4,454,414 A | | 6/1984 | Benton |
| 4,677,657 A | * | 6/1987 | Nagata et al. ............... 455/558 |
| 4,857,913 A | | 8/1989 | Lewiner et al. |
| 4,918,416 A | | 4/1990 | Walton et al. |
| 4,962,485 A | | 10/1990 | Kato et al. |
| 5,196,682 A | | 3/1993 | Englehardt |
| 5,397,884 A | | 3/1995 | Saliga |
| 5,444,222 A | | 8/1995 | Inoue |
| 5,499,022 A | | 3/1996 | Boschini |
| 5,552,789 A | | 9/1996 | Schuermann |
| 5,656,867 A | | 8/1997 | Kokubu |
| 5,698,837 A | | 12/1997 | Furuta |
| 5,789,733 A | | 8/1998 | Jachimowicz et al. |
| 5,801,614 A | | 9/1998 | Kokubu |
| 5,838,235 A | | 11/1998 | Thorigne |
| 5,862,174 A | | 1/1999 | Yokota et al. |
| 5,889,273 A | | 3/1999 | Goto |
| 5,898,738 A | | 4/1999 | Nagata et al. |
| 5,929,414 A | | 7/1999 | Saitoh |
| 5,939,975 A | | 8/1999 | Tsuria et al. |
| 5,971,280 A | | 10/1999 | Hoolhorst |
| 6,011,320 A | | 1/2000 | Miyamoto et al. |
| 6,078,266 A | | 6/2000 | Yang |
| 6,138,916 A | | 10/2000 | Zolkos et al. |
| 6,145,748 A | | 11/2000 | Neifer et al. |
| 6,173,899 B1 | | 1/2001 | Rozin |
| 6,176,433 B1 | | 1/2001 | Uesaka et al. |
| 6,194,993 B1 | | 2/2001 | Hayashi et al. |
| 6,213,391 B1 | | 4/2001 | Lewis |
| 6,260,651 B1 | | 7/2001 | Kokubu et al. |
| 6,275,141 B1 | | 8/2001 | Walter |
| 6,616,054 B1 | * | 9/2003 | Norton ....................... 235/492 |

FOREIGN PATENT DOCUMENTS

JP    02000033851 A    2/2000

OTHER PUBLICATIONS

Casio HBX–100 'PC–Unite' databank watch, http://www.netcomuk.co.uk/~ww|/casiowatch.html, Mar. 6, 2002, pp. 1–3.
Smart Card Over–the–Air Activation, Nortel Wireless Networks, http://www.nortel.com/wireless, Sep. 1997.
End–User Products, ActivCard Gold™, http //www.activcard.com/activ/products/end_user/activ_card_gold/index.html, Mar. 19, 2002, pp. 1–3.
We Identify With Your Business, www.HIDCorp.com, HID Corporation, 2001.
W. Kinsner, Tutorials in 1999: Smart Cards, http://www.ee.umanitoba.ca/~kinsner/whatsnew/tutorials/tu1999/smcards.html, Mar. 19, 2002, pp. 1–7.
Petri, S., An Introduction to Smart Cards, http://www.e-ma.org/restricted/magazine/mmv5n5/SmartCards.htm, Mar. 19, 2002, pp. 1–13.
ISO7816 (parts 1–3) Asynchronous Smart Card Information; http://www.scia.org/aboutSmartCards/Iso7816_wimages.htm, Mar. 19, 2002, pp. 1–23.

* cited by examiner

Primary Examiner—Karl D. Frech
Assistant Examiner—Daniel Hess
(74) Attorney, Agent, or Firm—Kirkpatrick & Lockhart LLP (57) ABSTRACT

Disclosed is a smart card that can be personalized with indicia or graphic designs over an entire surface of one face of the smart card. The entire surface of the one face can be utilized for personalization by placing the contact module on an opposite face of the smart card.

32 Claims, 10 Drawing Sheets

SMART CARD SYSTEM, APPARATUS AND METHOD WITH ALTERNATE PLACEMENT OF CONTACT MODULE

BACKGROUND

1. Technical Field

The invention relates generally to smart cards and, more particularly to a system, apparatus and method related to contact smart cards having a contact module in an alternate placement.

2. Description of Related Art

A smart card is a "credit card" sized card that contains electronics. Some cards include a microprocessor and a memory while some cards contain a battery and others do not. The smart card can be used to store large volumes of data. Smart cards are generally tamper-resistant hardware devices and can store private keys and other sensitive information making them ideal for data security applications. Contactless cards, which do not require physical contact between the card and a device used to read it, wirelessly transact information and thus avoid the problem of wear and tear, a problem that afflicts traditional credit cards. For example, embossed numbers on the front and magnetic strips on the back of general purpose credit cards suffer from wear and tear, which can eventually render the card unusable for its intended purpose. Smart cards may be simple memory cards with hardwired logic or may contain a microprocessor. As smart card technology continues to evolve, new and specialized versions of it will continue to be developed. Memory based cards merely store information or values, such as debit or credit information, for example. Microprocessor based cards, on the other hand, can perform calculations, including complex processing and can be used in security applications. Unlike contactless cards, contact cards rely on a physical electrical contact and read information when the card is inserted into a smart card reader. Combination cards can utilize both a contact and a contactless card reader. Harry Newton. *Newton's Telecom Dictionary*. Miller Freeman. Inc. Secaucus. N.J. (1999). p. 721.

The electronic device embedded within the smart card is generally some type of integrated circuit chip. In addition to the integrated circuit, the smart card can generally be formed with or without a magnetic stripe and can include an electronic contact module for supporting the electrical contacts to the integrated circuit. The smart card can store and transact information between the card and various other devices, such as for example, a smart card reader. Furthermore, the smart card can provide memory storage as well as computational capability depending on the particular application. The integrated circuit employed in a smart card can be, for example, a microprocessor with internal memory or a memory chip. At one end of the sophistication scale a smart card simply provides memory for storing an identification code while, at the other end of the scale, a smart card provides the computational capacity of a general purpose computer that includes a Central Processing Unit (CPU), Input/Output (I/O) control, Read Only Memory (ROM), Non-Volatile Memory (NVM) and Random Access Memory (RAM). Key applications for smart cards commonly include user identification, transportation, telephone, banking, healthcare, debit purchasing, entertainment, loyalty programs, e-commerce, securing information, telecommuting and networking, campus badging and access, and many other applications which are limited only by the developer's imagination.

As discussed hereinbefore, there are various types of smart cards designed for a specific application. Smart cards also generally include contact and contactless types. A contact type smart card includes an integrated circuit that communicates directly by way of a physical electrical connection to a reader. The contact type smart card typically includes a gold plated conductive contact module that is provided on a front surface of the smart card. The contact smart card requires the user to insert the card into a smart card reader. Inside the smart card reader, the gold plated conductive contact module makes a direct physical electrical connection to electrical contacts provided within the reader. Information including commands data, algorithms and card status stored within the smart card are then transmitted through the physical connection.

A contactless type smart card includes an integrated circuit that communicates remotely, or wirelessly, by way of an electromagnetic interface when the smart card is placed in proximity of the card reader. The contactless "proximity" smart card utilizes an internal antenna and an electromagnetic signal for transmitting information between the smart card and the reader. Accordingly, the contactless card need only be placed in proximity of the reader, for example within two to three inches of the reader, in order to get energized and begin a transaction.

Contactless smart cards come in passive and active varieties. Passive contactless cards are generally non-battery-powered and must derive the energy to power the integrated circuit from an external electromagnetic field generated by the reader. One drawback of the passive contactless smart card is that only a limited amount of power can be transmitted from the reader. However, passive contactless smart cards can be made having the same thickness as standard sized credit cards because there is no need to provide a bulky battery within the smart card body. Active contactless smart cards generally include a battery within the plastic card body itself in order to provide additional power to the transmitter. However, because batteries are relatively bulky (i.e., even thin watch batteries are several times thicker than a standard credit card), the active contactless cards cannot be made having the same thickness of a credit-card style smart card and are much thicker in order to accommodate the battery.

There are, however, two additional categories of smart cards that are derived from the contact and contactless family. Namely, these smart cards are combination cards and hybrid cards. Combination cards generally include a single integrated circuit having both a contact module and a contactless interface, either of which can communicate between the integrated circuit and the smart card reader. Hybrid cards, on the other hand, include two separate integrated circuits and are sometimes referred to as dual-chip cards. The integrated circuits in a hybrid card include respective contact and contactless interfaces, but the two integrated circuits are not connected to each other within the smart card.

Smart cards are also categorized according to the type of integrated circuit used in the smart card. For example, there are smart cards that include a memory chip and there are smart cards that include either a microprocessor or a microcontroller. Smart cards having only memory chips are merely storage devices and do not have any computational capability. Their function is similar to a floppy disk that can store anywhere from a few bits to a few thousand bits. For example, memory smart cards generally store between 103 and 16,000 bits of data. Memory smart cards are less expensive than microprocessor cards but lack the sophistication of data security, data management and computational capabilities.

Alternatively, microprocessor or micro-controller based smart cards are much more sophisticated and are capable of managing data stored in its memory circuits. For example, these smart cards can edit and otherwise manipulate the data stored in its memory circuits. The computational functionality of microprocessor-based smart cards also includes the ability of managing complex algorithms. Such smart cards are really miniature computers that include microprocessors having 8, 16 or 32 bit architectures with data storage capacity ranging from 300 bytes to 32,000 bytes. However, increased computing power and storage capacity can be expected with future development and advances in semiconductor technology.

Contactless proximity smart cards require electrical power in proportion to the amount of data that is to be transmitted from the smart card. In order to transmit large amounts of data, active contactless proximity smart cards have included an internal battery. As discussed above, the draw back of this approach is that the smart card body must be made larger than the standard credit card size in order to accommodate the battery. Standard non-battery contactless smart cards (i.e., passive smart cards) are incapable of transmitting large amounts of data because they receive a limited amount of energy from the electromagnetic signal transmitted by the card reader. Therefore, there is a need in the art to provide electrical power from an external power supply other than the card reader to a non-battery contactless smart card. The additional power would facilitate the transmission of large amounts of data. Nevertheless, there is also a need to maintain the physical size of the contactless proximity card to a standard "credit card" size as specified in ISO Standard 7816, which is herein incorporated by reference in its entirety.

Furthermore, there is a need in the art to provide a system wherein the operation of a vehicle, or other kinds of equipment, is controlled by way of an authorization code such that only authorized users can access the vehicle and the other kinds of equipment without tumbling with keys or pressing buttons on wireless transmitters. There is also an interest in providing society with the benefits of a more effective way of preventing vehicle thefts by restricting the operation of vehicles and other forms of equipment utilizing authorization codes.

Moreover, contact smart cards having chip contact modules on a front portion of the card body take up valuable surface area that can be used for printed material. Therefore, there is a need for a smart card wherein the entire surface area of the front portion, or top side, of the card body can be utilized for personalized graphics, alphanumeric symbols, pictures, art-work and other indicia or printed material on.

Yet, there is still a need in the art for a smart card having an optical communication interface. Therefore, there is a need for providing a smart card using an optical interface for communicating information between the smart card and a reader.

SUMMARY

According to one embodiment, the present invention is directed to a smart card that can be personalized on an entire surface of a front portion of the smart card. The front portion can be provided with various graphic indicia and other printed matter because the contact module is provided on a rear portion of the smart card.

Accordingly, one aspect of the invention provides a smart card that includes a front portion for displaying indicia; a rear portion laminated to the front portion; a circuit laminated between the front and rear portions; and a contact module in communication with the circuit. In one embodiment, the circuit is an integrated circuit and in another includes a microprocessor; a memory in communication with the microprocessor; and an input/output controller in communication with the processor. The smart card also can include an antenna laminated between the front and rear portions and can include a power converter laminated between the front and rear portions, the power converter in communication with the antenna and the circuit, wherein the power converter supplies a power supply voltage to the circuit. In yet another embodiment, the smart card includes an optical transceiver disposed on the rear portion of the smart card. In a further embodiment, the entire surface area of the front portion of the smart card is available for receiving indicia.

Another aspect of the invention provides a system for transferring information between a smart card and a smart card reader. The system includes a smart card including a front portion for displaying indicia; a rear portion laminated to the front portion; a circuit laminated between the front and rear portions; and a contact module in communication with the circuit; and a smart card reader for receiving the smart card and transferring information between the smart card reader and the smart card by way of the contact module disposed on the rear portion of the smart card.

A further aspect of the invention provides a method for transacting information in a smart card system including a contact smart card and a contact smart card reader. The method includes transmitting a signal to the contact smart card by way of a contact module disposed on a rear portion of the contact smart card; and initiating communication between the contact smart card and the contact smart card reader when the contact smart card is inserted in the contact smart card reader. In one embodiment, the method includes transmitting the signal from the contact smart card reader. In another embodiment, the method includes transmitting the signal from an external power supply other than a power supply within the contact smart card reader.

These and other inventions will be apparent from the detailed description hereinafter.

BRIEF DESCRIPTION OF THE DRAWINGS

The present invention will be described in conjunction with the following figures, wherein.

DETAILED DESCRIPTION

It is to be understood that the figures and descriptions of the present invention have been simplified to illustrate elements that are relevant for a clear understanding of the present invention, while eliminating, for purposes of clarity, other elements of a conventional nature.

Figure 1:
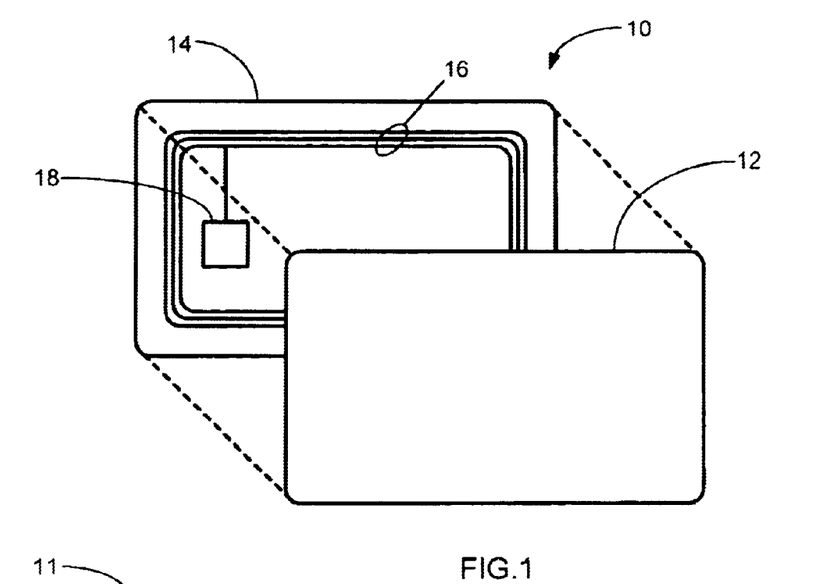
FIG. 1 illustrates one embodiment of a non-batter contactless smart card according to the present invention.

FIG. 1 illustrates generally at 10 one embodiment of a passive non-battery contactless radio frequency (RF) enabled smart card or proximity smart card. The body of the contactless smart card 10 includes a front portion 12 and a rear portion 14 and embedded therebetween are an antenna 16 (or coil) and an integrated circuit 18. The antenna 16 can be formed using three to five turns of very thin commercially available wire, for example, or it can be formed using conductive ink. In either case, the antenna 16 is connected to an integrated circuit chip 18. In a contactless smart card system both the reader and the smart card have an antenna tuned to the same frequency thereby forming a contactless wireless communication link. Generally, the contactless smart card 10 is passive in that it does not include a battery and derives its power from a radio frequency electromagnetic signal transmitted by the smart card reader. Thus the physical characteristics of the passive contactless smart card 10 are essentially the same as a standard sized credit card. On the other hand, active proximity smart cards that include a battery are made thicker in order to accommodate the battery and therefore deviate from the standard credit card sizes, especially with respect to the card's thickness.

The front and rear portions 12, 14 of the smart card 10 are laminated so as to form a single unit and serve to sandwich the antenna 16 and the integrated circuit 18 therebetween. The body of the smart card is generally formed from plastic, such as Acrylonitrile Butadiene Styrene (ABS) and Polyvinyl Chloride (PVC), for example. The front portion 12 of the contactless smart card is generally, prepared for receiving personalization indicia and graphics thereon. The personalization indicia and graphics may be provided on the surface of the front portion 12 by was of full color printing, using a thermal transfer process, or by a dye sublimation process, for example. The final product generally includes a transparent overlay or varnish coating. The rear portion 14 of the contactless smart card 10, while it can receive indicia, is generally reserved for a magnetic stripe. In general, the front portion 12 of the card body as described herein is distinguished from the rear portion 14 of the card body.

The integrated circuit 18 sandwiched within the contactless smart card 10 is generally realized using Very Large Scale Integration (VLSI) whereby several thousand transistors are combined on a single silicon substrate having a relatively small surface area of about a few square millimeters. All the circuit components of the integrated circuit 18 must fit within these relatively small confines. For example, in one embodiment, the integrated circuit 18 should not exceed 25 square mm or approximately 0.04 square inches. One reason for the size limitation is that the integrated circuit 18 is made from silicon which has the consistency and fracture characteristics of glass and is particularly easy to break. Accordingly, it is desirable for the size of the integrated circuit 18 to be limited to only about a few square millimeters in order to accommodate the inevitable flexure that the plastic contactless smart card 10 may encounter while in use.

The physical size of the smart card 10 is generally about the same as a standard credit card. The exact specifications are provided in International Standards Organization (ISO) publication numbers 7810, 7816/1 and 7816/2, each of which is incorporated herein by reference in its entirety. Generally the physical size of the smart card 10 is about 85.60 mm×53.98 mm×0.80 mm, or about 3.4"×2.1"×0.3". However, smart card size can vary in length between 85.47 mm to 85.72 mm (3.36" to 3.37"); in width between 53.92 mm to 54.03 mm (2.12" to 2.13); and in thickness between 0.70 mm and 0.90 mm (0.028" to 0.035"). Those skilled in the art will appreciate, however, that the scope of the invention is not limited to such card sizes as described herein.

Figure 2:
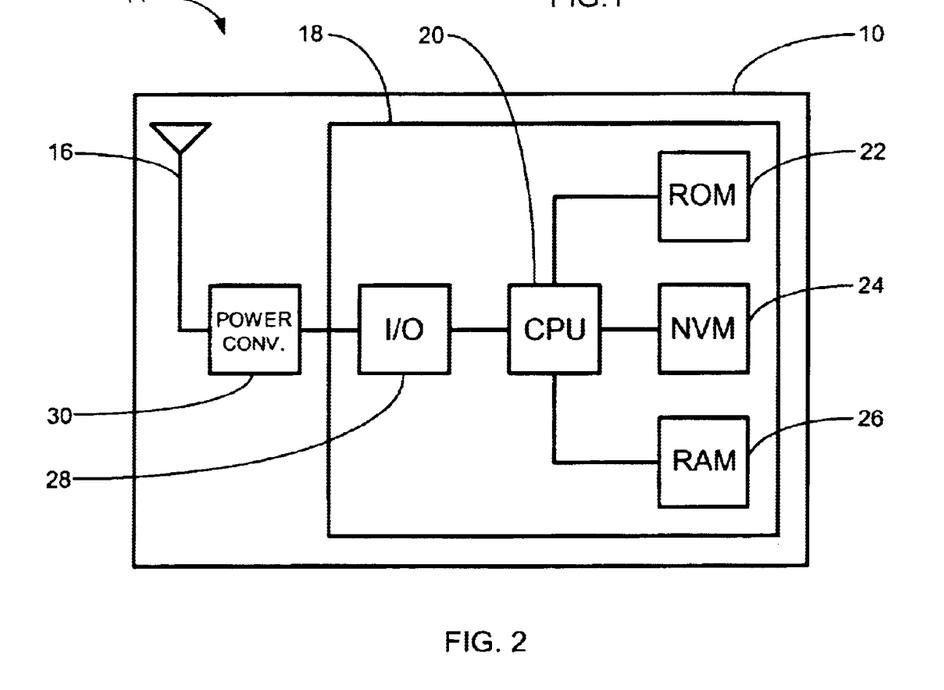
FIG. 2 illustrates one embodiment of a logic block diagram of a non-battery contactless smart card according to the present invention.

FIG. 2 illustrates generally at 11 one embodiment of a logic diagram of the contactless smart card 10. In one embodiment, the smart card integrated circuit 18 includes a Central Processing Unit 20 (CPU), memory and some form of Input/Output Control logic 28. The memory portion generally includes a Read Only Memory 22 (ROM), a Non-Volatile Memory 24 (NVM) and a Random Access Memory 26 (RAM). The NVM 24 can be an Electrically Erasable Programmable Read Only Memory (EEPROM) that retains its logic state when power to the integrated circuit 18 or the EEPROM itself is removed, for example. Essentially, the contactless smart card 30 can include the same functional components as a general-purpose computer and is provided in an easy to use credit card sized plastic package. As described hereinbefore, the contactless smart card 10 further includes the antenna 16 for exchanging information with a contactless smart card reader.

Those skilled in the art will appreciate that the smart card 10 generally does not include its own clock for driving the internal logic, but rather the clock signal is provided from an interface peripheral such as the contactless smart card reader. The clock frequencies generally include 3.579545 MHz and 4.9152 MHz although the scope of the invention is not limited thereto. The contactless smart card 10 generally can communicate at speeds of about 9600 bits per second. Furthermore, the memory requirements of the contactless smart card 10 will vary based on the ultimate application and range from about 128 bytes to about 780 bytes of RAM 26, about 4 Kb to about 20 Kb of ROM 22 and about 1 Kb to about 16 Kb of NVM 24, for example. The microprocessor architecture can be based on 8, 16 or 32 bits. In one embodiment the microprocessor or CPU 20 can be based on the Motorola 6805 or Intel 8048 architectures, for example.

The contactless smart card 10 further includes a conventional power converter 30 which can be made part of the integrated circuit 18 even though it is shown separately in the logic block diagram 11. The power converter 30 converts electromagnetic radiation detected by the antenna 16 into electrical power that is useable by the non-battery contactless smart card 10. In one embodiment, the power is transferred from the source using the principle of magnetic induction. for example. In one embodiment, the frequency of the electromagnetic energy used to energize the smart card 10 as detected by the antenna 16 is between about 10 MHz to 14 MHz and is preferably about 13.56 MHz. Further, in one embodiment the same antenna 16 is used for receiving and transmitting electromagnetic radiation to and from the contactless smart card 10 and the contactless smart card reader. The frequencies used by each smart card/card reader system are specific to the manufacturer of the devices and is generally in the microwave frequency band.

In operation, when the contactless smart card 10 is placed in proximity of the contactless smart card reader, for example within an operating range of a few inches from the card reader, it will initiate a transaction and exchange information therebetween. For example, the contactless smart card 10 can be placed within an operating range of approximately zero to five inches of the card reader and preferably between approximately zero to two or three inches of the card reader in order to be energized by the card reader and initiate a wireless communication transaction which can include the exchange of information contained within the contactless smart card 10 or contained within the smart card reader. One advantage provided by the contactless smart card interfaces is speed. For example, in using the contactless smart card 10, the user can simply wave the contactless smart card 10 within the specified operating range of the card reader rather than having to insert and remove the card in the reader, which can slow down the overall transaction.

Figure 3:
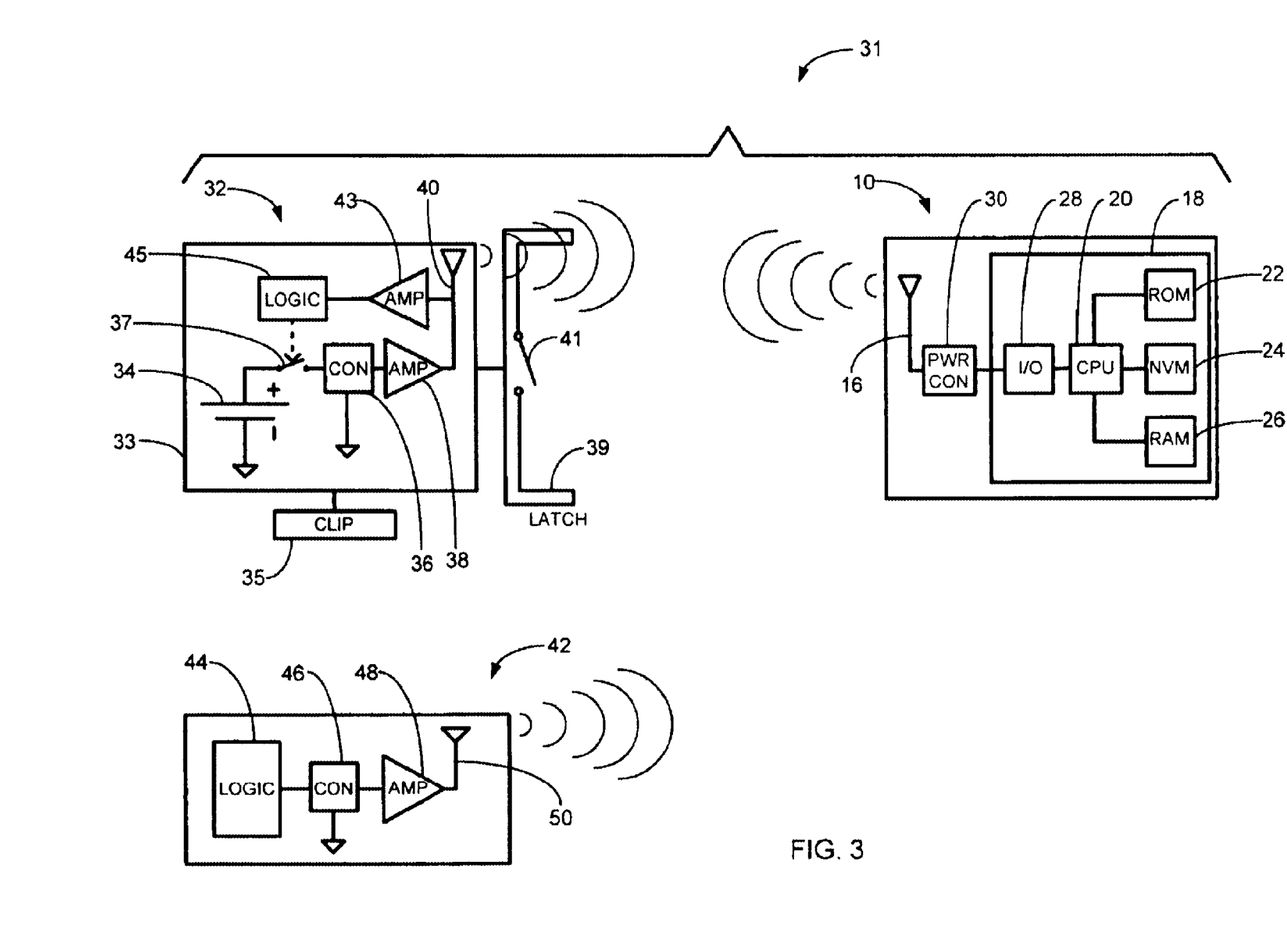
FIG. 3 illustrates one embodiment of a system for providing power to a smart card according to the present invention.

Now turning to FIG. 3 where a system for energizing the contactless smart card 10 is illustrated generally at 31. The system includes the non-battery contactless smart card 10 and an external power supply 32, which is other than a power supply provided by the smart card reader shown, generally at 42. In general, the external power supply 32 as described herein is distinguished from the power supply provided by the smart card reader 42. Accordingly, in one embodiment the external power supply 32 includes a battery 34 having a relatively high capacity so that it will not have to be replaced often, a voltage to frequency converter 36, a "first" amplifier 38 and an external power supply antenna 40. In one embodiment, the power from the battery 34 is switched ON and OFF by the voltage converter 36 at a frequency that will be recognized by the contactless smart card 10. Those skilled in the art will appreciate that the voltage converter 36 can take the form of a conventional DC-AC converter or a Voltage Controlled Oscillator (VCO), for example. The voltage converter 36 produces a signal at a predetermined frequency (e.g., 13.56 MHz) that is then coupled to the external power supply antenna 40 either directly or through the amplifier 38. The external power supply antenna 40 then radiates the electromagnetic energy at the signal frequency. When the contactless smart card 10 is placed in proximity, within a predetermined operating range (e.g., approximately zero to five inches) of the power supply 32, the smart card antenna 16 detects the radiated energy from the external power supply antenna 40. The power converter 30 then converts the detected energy into a voltage level that call be utilized by the integrated circuit 18. For example, the integrated circuit 18 can operate at voltage levels of about 4.75 V to about 5.25 V, although with advances in semiconductor technology these voltage levels may eventually drop to about 3 V.

In one embodiment, the energy supplied by the external power supply 32 can be used in conjunction with the contactless smart card reader 42 thereby supplementing the energy provided to the contactless smart card 10. The contactless smart card reader 42 generally includes a logic portion 44 that provides the appropriate signal to a voltage to frequency converter 46 similar to the voltage converter used in the external power supply 32. The switched power signal is then coupled to a contactless smart card reader antenna 50 directly or through a conventional amplifier 48. As discussed hereinbefore, the electromagnetic energy is radiated from the antenna 50 at a frequency that is detected by the smart card antenna 16 and that can be converted to a useful voltage by the power converter 30 (e.g., 13.56 MHz).

Those skilled in the art will appreciate, however, that the contactless smart card reader 42 can supply only a limited amount of energy for energizing the contactless smart card 10. Because of this limitation in energy, the contactless smart card 10 is able to transfer only a limited amount of information to the contactless smart card reader 42. Therefore, in order to transfer substantially greater amounts of information between the contactless smart card 10 and the contactless smart card reader 42 while maintaining the physical size of the contactless smart card 10 to the standard credit card size, additional power is supplied to the smart card 10 from the external power supply 32. Such additional energy transferred allows the contactless smart card 10 to transfer much more information to the contactless smart card reader 42. In one embodiment the external power supply 32 according to the invention begins radiating electromagnetic energy for energizing the contactless smart card 10 only when it receives a signal from the contactless smart card reader 42. In one embodiment the external power supply 32 according to the invention begins to radiate electromagnetic energy for energizing the contactless smart card 10 only when it receives a signal from the contactless smart card 10.

The physical characteristics of the external power supply 32 can take many forms. For example, in one embodiment the external power supply 32 can be provided within a housing 33 that the smart card user carries around. The external power supply 32 then transmits current by way of magnetic induction to energize the contactless smart card 10. In one embodiment the housing 33 can be outfitted with a card retainer such as a clip 35 that provides the added convenience of holding the contactless smart card 10. Furthermore, a first switch 37 may be provided in the external power supply 32 such that the external power supply 32 function can be turned ON and turned OFF by the user in order to save battery life, for example. Accordingly, the user can enable and disable the external power supply 32 by toggling the first switch 37. For example, whenever the user anticipates making a transaction, the user can enable the external power supply 32 and initiate the radiation of energy therefrom.

In one embodiment, the clip 35 can be a general-purpose clip generally use for holding identification car&s. In one embodiment the external power supply 32 can be provided with a latch 39 that is mechanically coupled to the housing 33 for receiving a smart card therein. The latch 39 can he provided with a second switch 41 that engages when a smart card is inserted therein. The second switch 41 can be utilized for enabling and disabling the operation of the external power supply 32 whenever it is engaged or disengaged by the contactless smart card 10, for example. Accordingly, in one embodiment, the external power supply 32 can be activated automatically upon the insertion of the contactless smart card 10 within the latch 39.

In one embodiment, the contactless smart card 10 includes an identification number. The operation of the external power supply 32 can then be controlled in accordance with the identification number. For example, the external power supply 32 can begin radiating electromagnetic energy for energizing the contactless smart card 10 whenever the contactless smart card 10 is in proximity of a triggering device and the external power supply 32 receives the appropriate identification number. A triggering device can be incorporated in a building security system. The triggering device can be a circuit that transmits periodic signals for querying contactless smart cards, thus triggering the smart card to initiate a transmission. Those skilled in the art will appreciate that triggering devices can be incorporated in any smart card reader or device used in conjunction with a smart card reader. Additionally, in one embodiment, the contactless smart card reader 42 generates a signal that when detected by the external power supply 32 causes the external power supply 32 to begin radiating energy for energizing the contactless smart card 10. In one embodiment, the external power supply can detect and decode the incoming identification number by using a second amplifier 43 and a logic circuit 45. The second amplifier 43 is coupled to the antenna 40 and provides the received signal to the logic circuit 45 that decodes the signal and then, for example, enables or disables the external power supply 32 by engaging or disengaging the first switch 37, respectively. In one embodiment, the system 31 can be expanded to include the operation of the contactless smart card reader 42 such that it also can provide a triggering signal to the external power supply 32. Furthermore, the contactless smart card 10 can provide a triggering signal to the external power supply 32 upon detecting a triggering signal from the contactless smart card reader 42 and thus trigger the external power supply 32 in order to initiate the radiation of energy for energizing the contactless smart card 10 and, for example, initiate a communication transaction.

The external power supply 32 supplies enough energy to the contactless smart card 10 to overcome the disadvantage of the limited data transmission. Accordingly, the power supplied by the external power supply can increase the amount of information transmitted by the contactless smart card 10. In other words, without the external power supply 32, the contactless smart card 10 would be limited to the energy supplied by the contactless smart card reader 42 and thus would be able to handle only a few short bursts of information during any given transaction. The external power supply 32 also overcomes the disadvantage of having to provide a battery within the contactless smart card 10 and thus eliminates the need for a larger (e.g., thicker) smart card than a standard plastic credit card. In the case of an active contactless smart card, the external power supply 32 would eliminate the need for frequent battery replacements.

Figure 4:
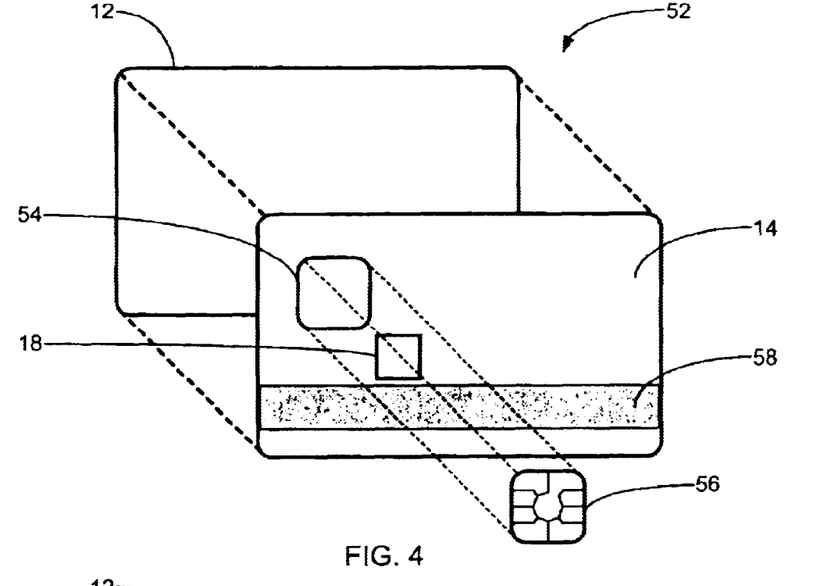
FIG. 4 illustrates one embodiment of a contact smart card according to the present invention.

FIG. 4 illustrates generally at 52 one embodiment of a contact smart card having a contact module 56 embedded on one side of the rear portion 14 of the smart card body. Further, in one embodiment, the contact module 56 is provided on the same side as a magnetic stripe 58. Those skilled in the art will appreciate that any smart cards may be supplemented with a magnetic stripe 58 for encoding and storing additional information. The contact smart card 52 includes a cavity 54 that is formed into the plastic on one side of the rear portion 14 of the card body. The cavity 54, which may, for example, be formed utilizing conventional milling techniques, provides a seat for the integrated circuit 18. The integrated circuit 18 is physically bonded to the contact module 56 utilizing conventional methods. The contact module 56 is bonded to the card body by a hot or cold glue process, for example.

The integrated circuit 18 witin the contact smart card 52 communicates with a contact smart card reader by way of a physical electrical contact through the contact module 56. In use, the contact smart card 52 is inserted into the contact smart card reader wherein the contact module 56 makes physical contact with an electrical contact within the smart card reader. Information that can be transferred by way of the contact module 56 includes power supply voltage, data, algorithms, commands, card status and other information. For example, the contact module 56 may include six contacts that are designed to provide power supply voltage to the integrated circuit 18, a ground reference, a reset signal line for initiating the state of the integrated circuit, a clock signal for driving, the logic of the integrated circuit 18 and a high voltage signal for programming the NVM 24.

Figure 5:
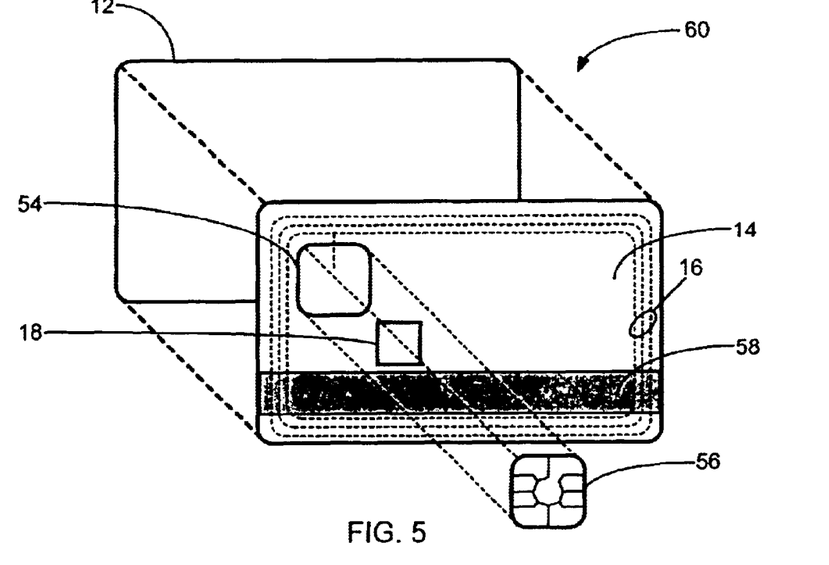
FIG. 5 illustrates one embodiment of a combination contactless type and contact type smart card according to the present invention.

FIG. 5 illustrates generally at 60 one embodiment of a combination passive contactless and contact smart card. The combination smart card 60 provides the contact module 56 on one side of the rear portion 14 of the card body. The combination card 60 also includes the contactless card antenna 16 for receiving and transmitting electromagnetic energy. Thus, the combination card can communicate wirelessly through a contactless link and also receive radiated energy for energizing the integrated circuit 18. Alternatively, the combination card 60 can be energized through the contact module 56 when the card is inserted in a contact smart card reader.

One advantage of one embodiment of the invention is that the contact module 56 is provided on one side of the rear portion 14 of the card body. Therefore, the entire surface area of the front portion 12 of the card body is available for personalization indicia, graphics, alphanumeric and any other personalization material that the smart card provider or user chooses without being interfered by the contact module 56. In one embodiment, the contact module 56 can be placed on the same rear portion 14 of the card body as the magnetic stripe 58, for example. In one embodiment, the rear portion 14 of the card body that includes the contact module 56 and the magnetic stripe 58 also can include a bar code and other encoding information. Furthermore, one advantage of placing the contact module 56 on the same side as the magnetic stripe 58, bar code, etc., is that it minimizes user confusion when using the contact smart card 52, 60.

Figure 6A:
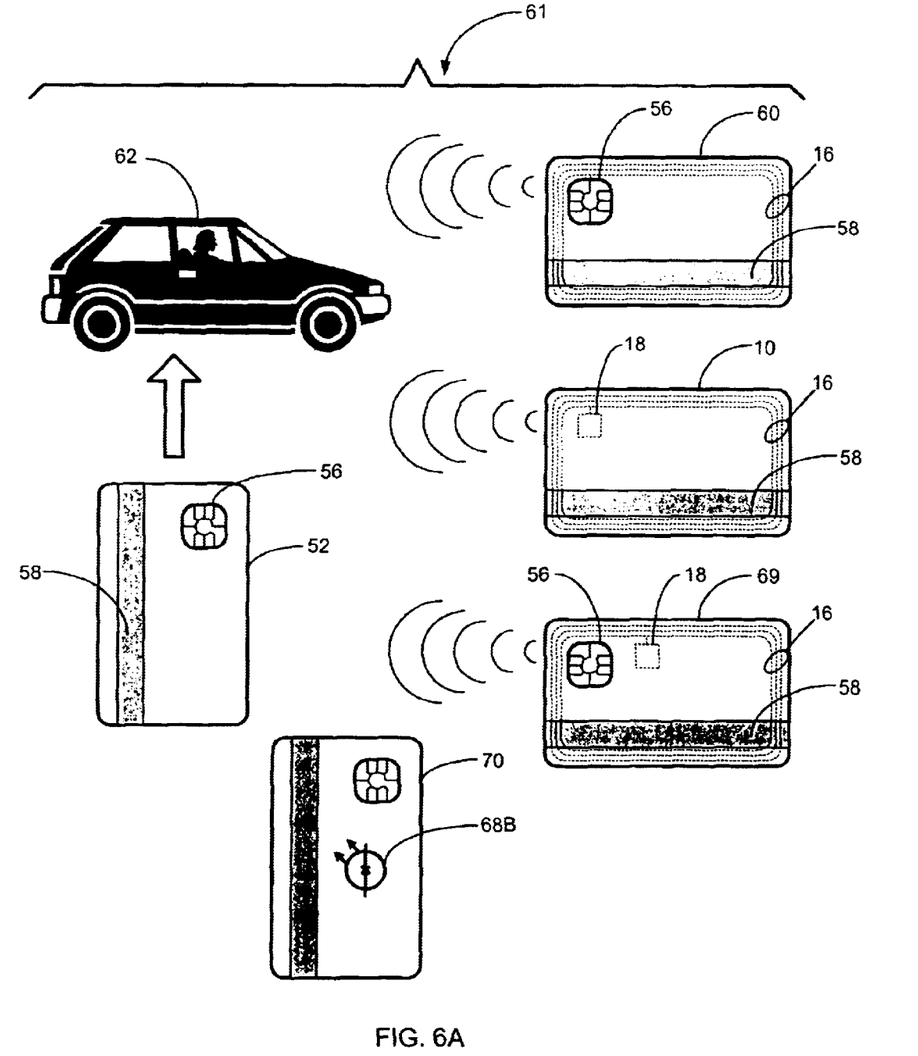
FIG. 6A illustrates a system for enabling the operation of one aspect of a vehicle using a smart card according to the present invention.

FIG. 6A illustrates generally at 61 a vehicle authorization system whereby an operator or driver of a vehicle 62 is given access to various devices associated with the vehicle 62 only if the contactless smart card 10, contact smart card 52, combination smart card 60, optical smart card 70 or hybrid smart card 69 generates an appropriate authorization code. The hybrid card 69 includes an integrated circuit 18 for the contactless interface and an integrated circuit for the contact module 56, but the two integrated circuits are not connected to each other within the smart card 69. The optical smart card 70 includes a conventional optical transceiver 68B that also can be used in the system 61 (see FIGS. 7A–B for additional description of the optical smart card and associated reader). Upon receiving the appropriate authorization code, the driver would gain access to the particular function authorized. For example, an authorization code may be stored in the smart card 10, 52, 60, 69 such that the driver cannot engage the starter and therefore cannot start the operation of the vehicle 62. The authorization code stored in the vehicle 62 and in the smart card 10, 52, 60, 69, 70 can be modified after a predetermined number uses. Once modified, the new authorization code is stored in the vehicle storage 76 as well as the smart card memory 22, 24, 26, and preferably the NVM 24. The periodic modification of the authorization code can serve to enhance the overall security aspect of the vehicle authorization system 61.

It will be appreciated that the contactless smart card 10 may provide the most convenient implementation of the authorization system 61 wherein the user merely has to bring the contactless smart card 10 in proximity of the vehicle 62 in order to initiate a transaction. Thereby eliminating the need for keys or any other manually operated keyless entry devices that require the user to press a button or make an electrical contact, for example. However, the contact smart card 52 and the combination smart card 60 also can be used without departing from the scope of the invention.

Furthermore, the authorization function is not limited to enabling the starter and includes enabling other functions such as the operation of the vehicle's locks, access to equipment located within the vehicle 62 and the like. For example, the smart card 10, 52, 60, 69 can be used to enable the steering mechanism, the radio, anti-lock breaking system, fuel injection mechanism, engine speed or RPM, the engagement of the transmission, the engagement of the clutch and any other functions that can be controlled with an authorization code. Alternatively, without an authorization code form the smart card 10, 52, 60, 69 the vehicle 62 can be rendered completely inoperable. Furthermore, the vehicle 62 can be equipped with a keyless entry system that requires an authorization code from any one of the contactless smart card 10, the contact card 52 or the combination card 60, Moreover, in one embodiment, the contactless smart card 10 can receive MP3 files and provide the user with up to several hours worth of music. The smart card 10, 52, 60, 69 can be used to store the MP3 music files and manipulate the files as well.

Figure 6B:
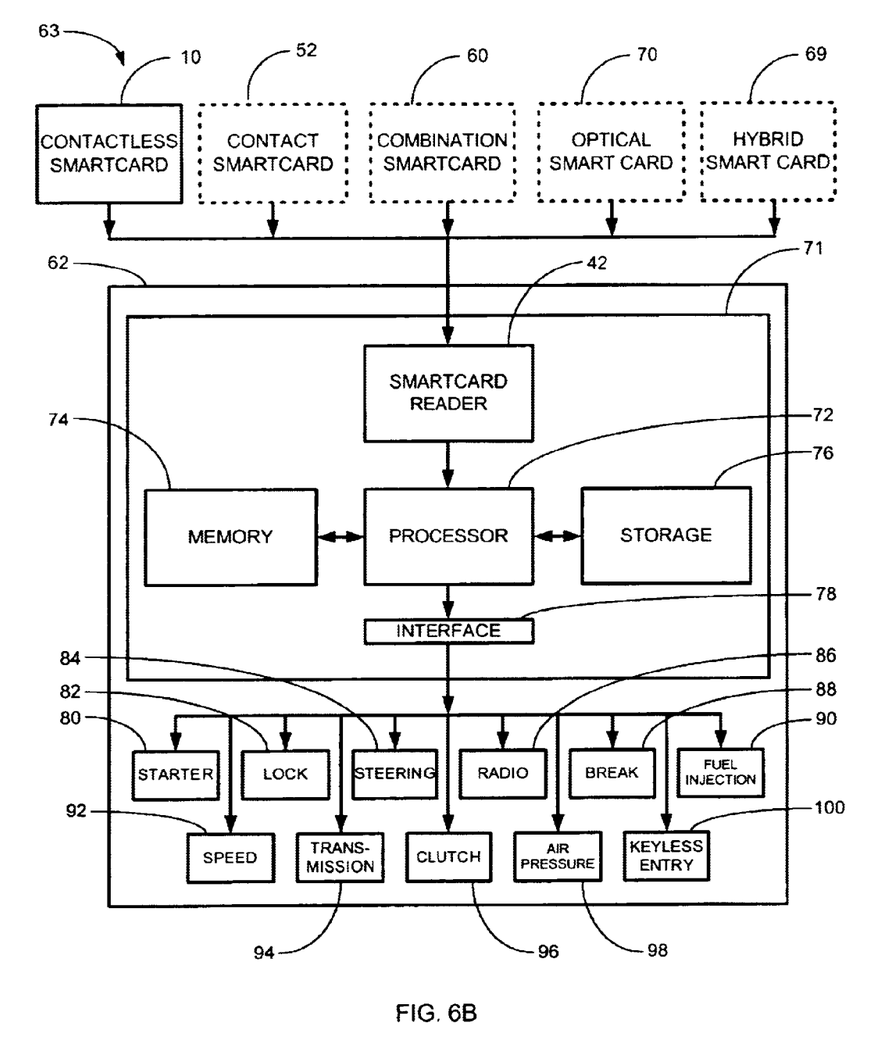
FIG. 6B illustrates a logic block diagram of a system for enabling the operation of a device associated with a vehicle.

Now turning to FIG. 6B where a logic block diagram of the system 61 is illustrated generally at 63. The system 63 includes the vehicle 62 having a controller 71 therein. In one embodiment of the system 63, the controller 71 includes a smart card reader 42, a processor 72 in communication with the smart card reader 42, a memory 74 in communication with the processor 72, a storage 76 in communication with the processor 72 and an interface 78 in communication with the processor 72. The smart card reader 42 can be any one of a contactless smart card reader, a contact smart card reader, a combination smart card reader, a hybrid smart card reader or an optical smart card reader (see optical smart card reader 64 at FIG. 7A) without departing from the scope of the invention. Accordingly, the system 63 can receive an authorization code from any one of a contactless smart card 10, a contact smart card 52 a combination smart card 60, the optical smart card 70 or the hybrid card 69.

When the user of the vehicle 62 provides the proper authorization code by way of a smart card 10, 52, 60, 69, 70, the controller 71 enables the user to activate any one of the appropriate devices associated with the vehicle 62. Accordingly, in one embodiment, when the user provides the controller 71 with an authorization code by way of a contactless smart card 10, a contact smart card 52, a combination smart card 60 or an optical smart card 70 to the smart card reader 42, the processor 72 looks up the authorization code in the storage 76 and provides control access to the user only if a match is found. In one embodiment, the processor 72 can change the authorization code and store the new value in the storage 76 as well as in the smart card by way of the smart card reader 42. Once the processor 72 grants authorization, control of one or more devices associated with the vehicle is provided through the interface 78. Those skilled in the art will appreciate that the interface may or may not be required based upon the control inputs available in each device. One example of the types of devices that can be controlled is any one, all or combination of a starter 80, a lock 82, a steering mechanism 84, a radio 86, a brake 88 system including an anti-lock brake system, a fuel injection mechanism 90, an engine speed controller 92, a transmission 94, a clutch 96, air pressure 98 and a keyless entry security system 100. However, the invention is not intended to be limited to such devices as other devices capable of being controlled by the controller 71 call be adapted operated when the proper authorization code is provided to the vehicle 62 by way of a smart card 10, 52, 69, 70.

Figure 7A:
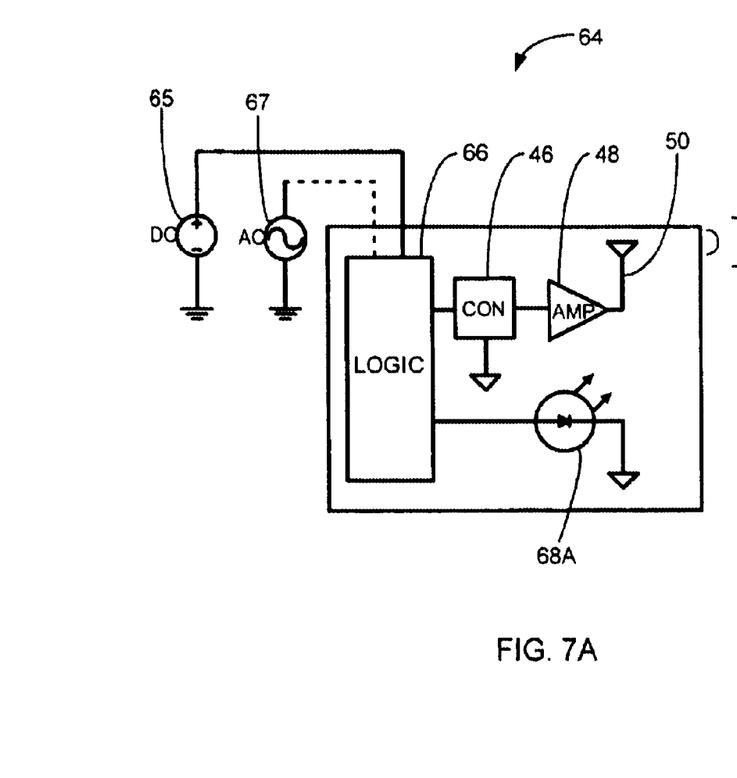
FIG. 7A illustrates one embodiment of an optical smart card reader according to the present invention.
Figure 7B:
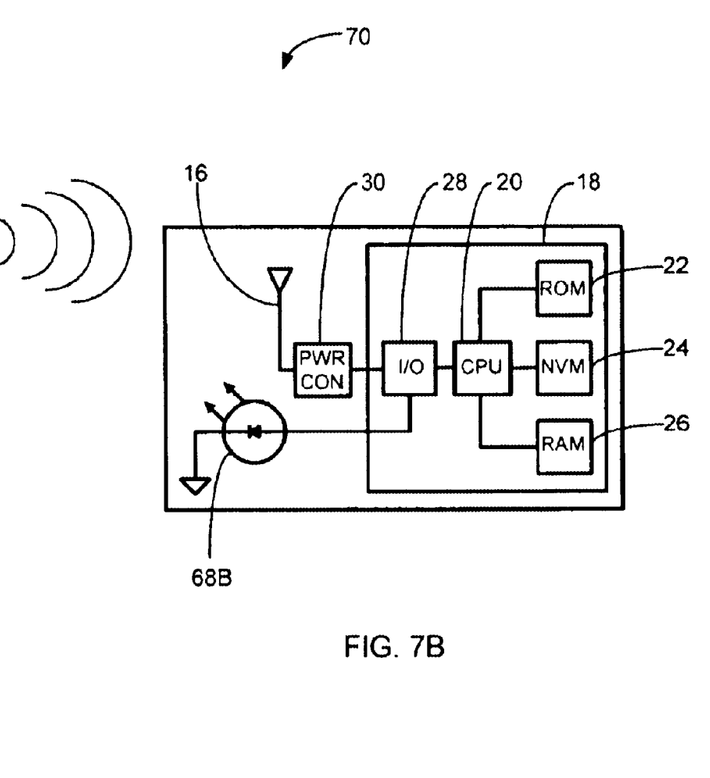
FIG. 7B illustrates one embodiment of an optical smart card according to the present invention.

FIG. 7A illustrates an optical smart card reader embodiment generally designated as 64. The optical smart card reader 64 can be used in combination with an optical smart card 70 as illustrated in FIG. 7B for communicating with the optical smart card 70 by way of an infrared communication link, for example. The information exchange between the optical reader 64 and the optical smart card 70 is generally bi-directional. The optical smart card reader 64 can be powered by a Direct Current (DC) source 65 or an Alternating Current (AC) source 67. The optical smart card reader 64 includes a logic portion 66 which can be a microprocessor, fixed logic, programmable logic, field programmable logic and the like. The logic portion 66 provides the appropriate signals to an optical transceiver 68A. The optical transceiver 68A is used for receiving and transmitting information over an optical medium such as infrared, for example.

The optical smart card reader 64 also can include a voltage converter 46, amplifier 48 and antenna 50 for supplying energy to the optical smart card 70. Those skilled in the art will appreciate that the optical smart card 70 also can be energized by the external source 32 as well as by the optical smart card reader 64. Furthermore, the voltage converter 46 can be adapted for converting either the DC source 65 or the AC source 67 into a signal having the appropriate frequency (e.g., 13.56 MHz) for transmitting electromagnetic energy and coupling the energy by way of magnetic induction to the optical smart card 70equipped with antenna 16 and power converter 30. In one embodiment, the optical smart card reader 64 is an interface that is an integral component of a computer screen or a general-purpose computer.

FIG. 7B illustrates an embodiment of the optical smart 70 card. The optical smart card 70 includes an optical transceiver 68B for receiving and transmitting information over an optical link (e.g., an infrared link). The optical transceiver 68B can be matched with the optical characteristics of the optical transceiver 68A or can be of the same type. As discussed hereinbefore, the optical smart card 70 also can receive electromagnetic radiation for energizing the integrated circuit 18 and the optical transceiver 68B through the antenna 16.

Referring to both FIGS. 7A and 7B, in one embodiment, the transceiver 68B transmits a first optical signal to the transceiver 68A and receives a second optical signal from the transceiver 68A. Likewise, the transceiver 68A receives a first optical signal from the transceiver 68B and transmits a second optical signal to the transceiver 68B. Communication is carried out between the optical smart card 70 and the optical smart card receiver 64 by exchanging a one or more optical signals therebetween.

Figure 8:
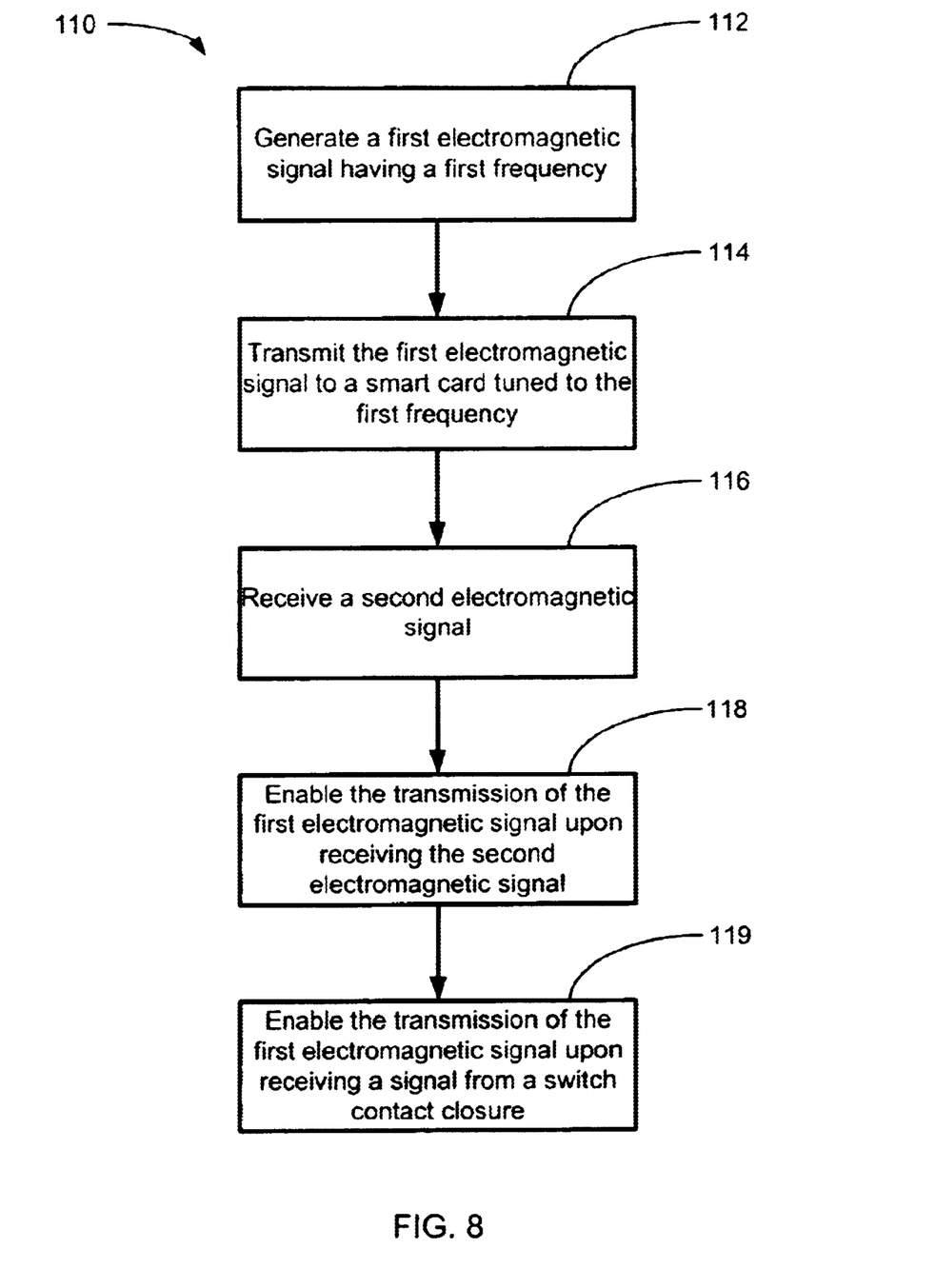
FIG. 8 illustrates one embodiment of a flow diagram of a method of supplying power to a smart card.

Now turning to FIG. 8, which comprises a flow diagram of a method 110 according to one embodiment of the present invention. In one embodiment, the method 110 includes a method of supplying power to a smart card 10, 60, 70, Accordingly, at block 112, the method 110 includes generating a first electromagnetic signal having a first frequency. At block 114, the method 110 includes transmitting the first electromagnetic signal to a smart card 10, 60 tuned to the first frequency. In one embodiment, the method 110 also includes, at block 116 receiving a second electromagnetic signal and, at block 118, enabling the transmission of the first electromagnetic signal upon receiving the second electromagnetic signal. Still, in a further embodiment at block 119, the method 110 includes enabling the transmission of the first electromagnetic signal upon receiving a signal from a switch contact closure.

Figure 9:
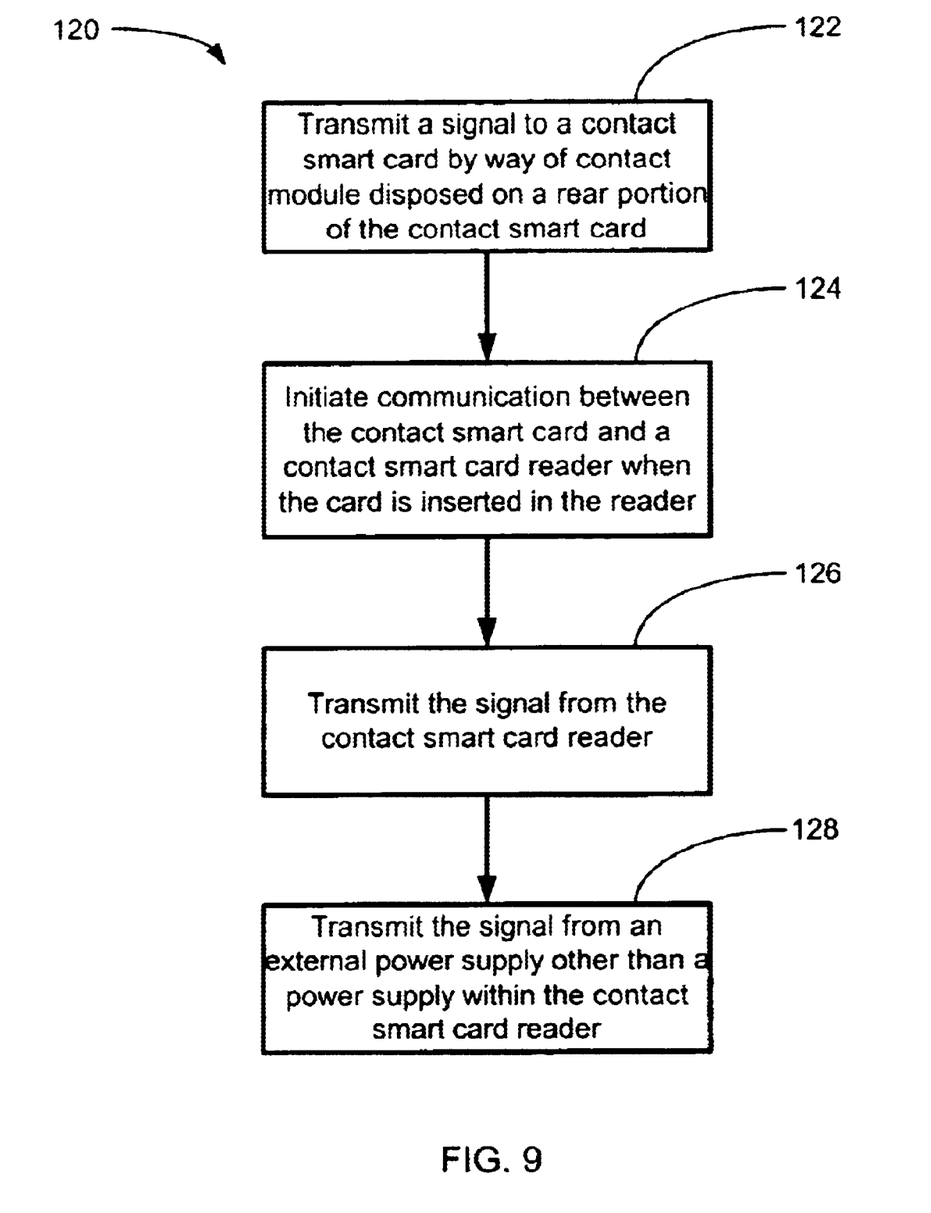
FIG. 9 illustrates one embodiment of a flow diagram of a method of transacting information from a smart card having a contact module on a rear portion of a smart card.

FIG. 9 comprises a flow diagram of a method 120 according to one embodiment of the present invention. In one embodiment, the method 120 includes, at block 122, transmitting a signal to the contact smart card 52, 60 by way of a contact module 56 disposed on the rear portion 14 of the contact smart card 52, 60, and at block 124, initiating communication between the contact smart card and the contact smart card reader when the contact smart card is inserted in the contact smart card reader. Still, in a further embodiment, at block 126, the method 120 includes transmitting the signal from the contact smart card reader. In yet another embodiment, at block 128, the method 120 includes transmitting the signal from an external power supply other than a power supply within the contact smart card reader.

Figure 10:
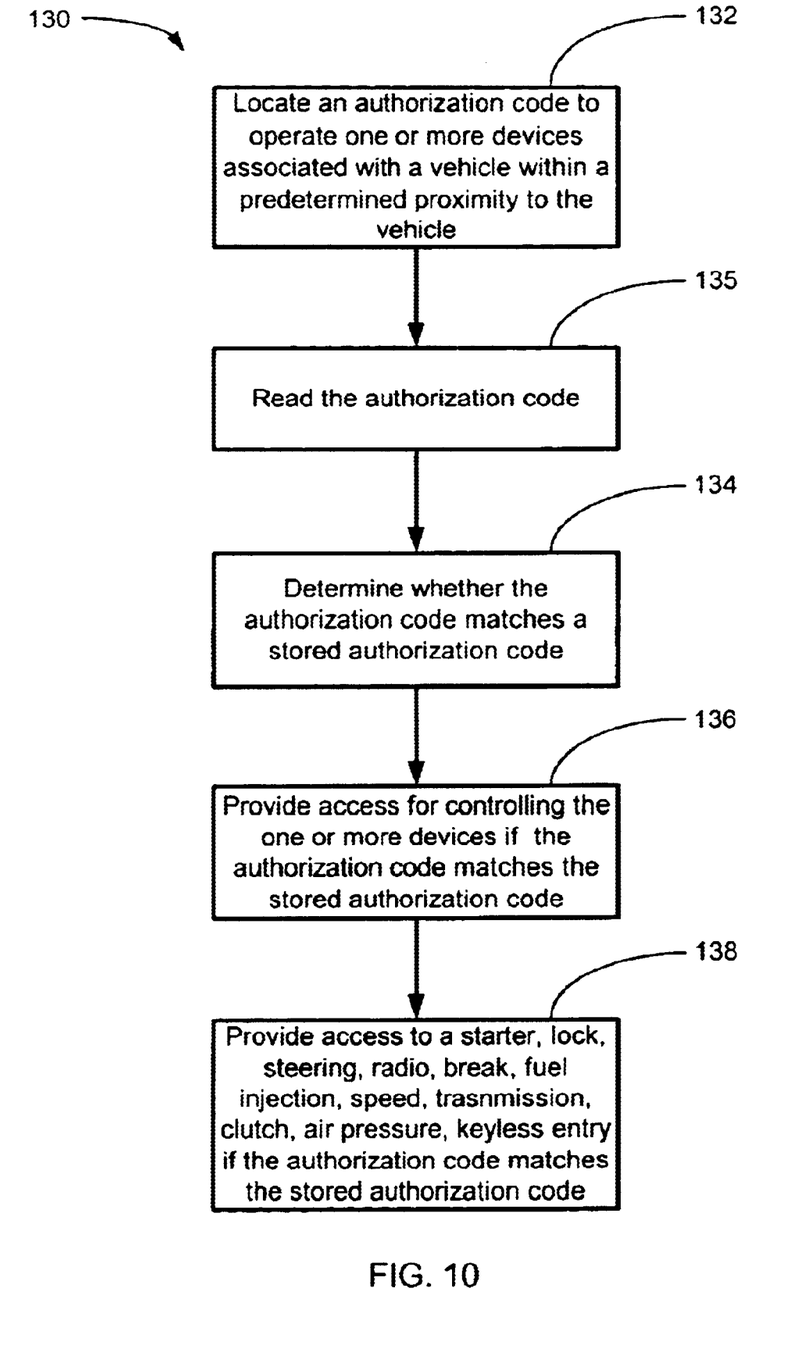
FIG. 10 illustrates one embodiment of a flow diagram of a method of authorizing the operation of one or more devices associated with a vehicle.

FIG. 10 comprises flow diagram of a method 130 according to one embodiment of the invention is illustrated generally at 130. In one embodiment, the method 130 includes a method of authorizing operation of one or more devices associated with a vehicle. At block 132 the method includes locating an authorization code to operate the one or more devices associated with the vehicle within a predetermined proximity of the vehicle. At block 135, the method includes reading the authorization code. At block 134, the method includes determining whether the authorization code matches a stored authorization code. At block 136, when the authorization code matches the stored authorization code, the method includes providing access for controlling the one or more devices authorized.

In one embodiment, locating a smart card includes locating a contactless smart card 10 having the authorization code thereon within the predetermined proximity to the vehicle 62. Further, in one embodiment, the method includes locating a combination smart card 60 or optical smart card 70 in proximity of the vehicle 62. In another embodiment, locating a smart card includes contacting a contact smart card 52 or a combination smart card 60 in a contact smart card reader associated with the vehicle 62.

In one embodiment, the method 130, at block 138, includes providing access for controlling the one or more devices authorized includes providing access for controlling vehicle functions selected from the group consisting of a starting the vehicle, locking the vehicle, steering the vehicle, operating a radio, operating an anti-lock breaking system, operating a fuel injection mechanism, controlling an engine, shifting a transmission, operating a clutch, operating a tire air pressure control system and a operating a keyless entry system.

Figure 11:
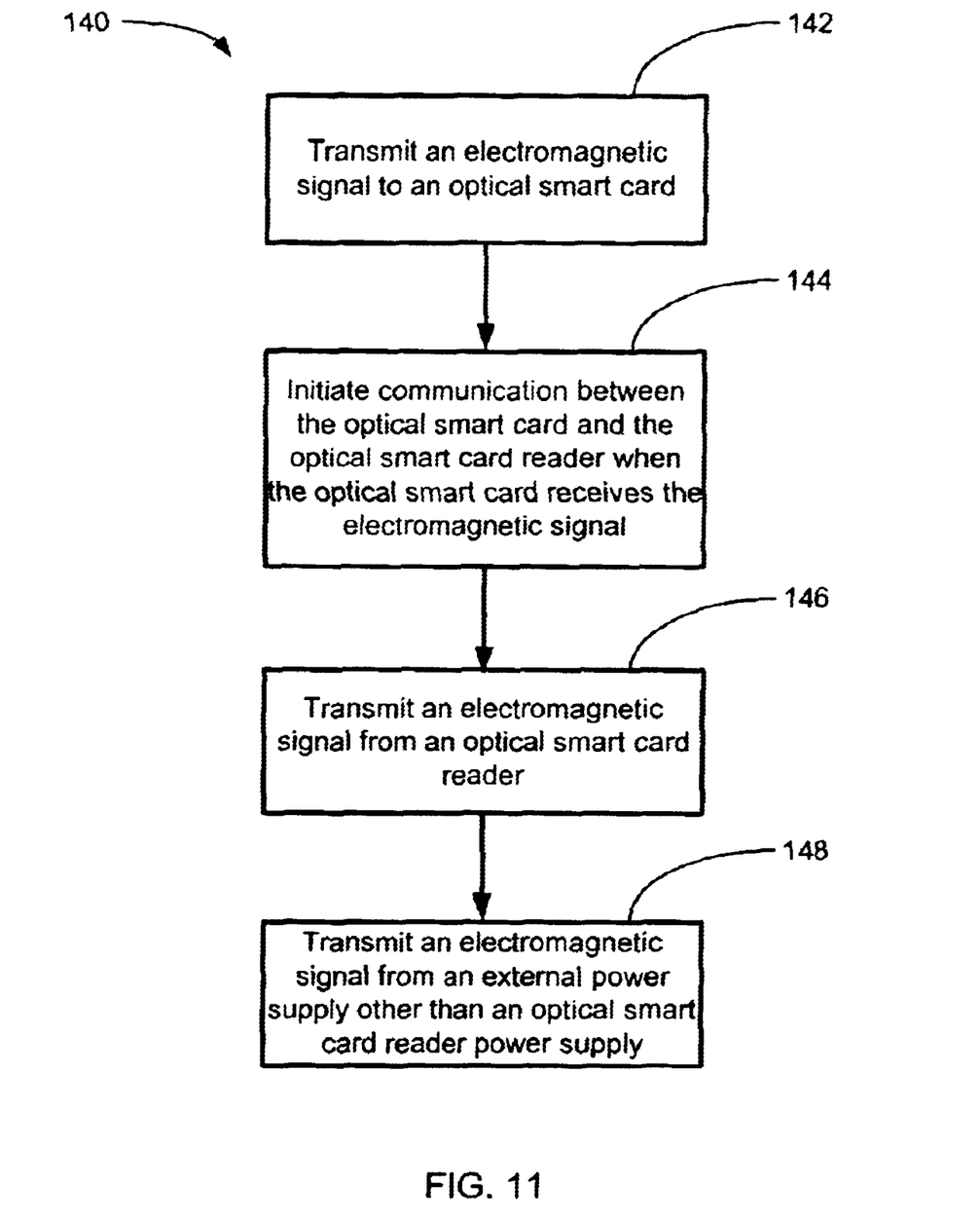
FIG. 11 illustrates one embodiment of a flow diagram of a method of transacting information in an optical smart card system.

FIG. 11 comprises a flow diagram of a method 140 according to one embodiment of the present invention. In one embodiment, the method 140 includes transacting information in an optical smart card system. At block 142 the method 140 includes transmitting an electromagnetic signal to the optical smart card 70. At block 144, the method 140 includes initiating communication between the optical smart card 70 and the optical smart card reader 64 upon the optical smart card 70 receiving the electromagnetic signal. In one embodiment, as shown at block 146, an electromagnetic signal can be transmitted from the optical smart card reader and in another embodiment, as shown at block 148, an electromagnetic signal can be transmitted from the an external power supply 32, other than an optical smart card reader power supply.

The foregoing description of the specific embodiments of the various embodiments of the invention has been presented for the purpose of illustration and description. It is not intended to be exhaustive or to limit the investigation to the precise form disclosed. Many modifications and variations arc possible in light of the above teachings. It is intended that the scope of the invention be limited not with the description above but rather by the claims appended hereto.

What is claimed is:

1. A smart card system, comprising:
    a smart card, comprising:
        a front portion for displaying indicia;
        a rear portion laminated to the front portion;
        a circuit laminated between the front and rear portions;
        an antenna laminated between the front and rear portions;
        a power converter laminated between the front and rear portions, the power converter in communication with the antenna and the circuit, wherein the power converter supplies a power supply voltage to the circuit;
        a contact module located on the rear portion in communication with the circuit;
        wherein the contact module and the front portion are located on opposite sides of the smart card; and
    a portable power supply in wireless electromagnetic communication with the power converter, wherein the portable power supply is external from a smart card reader.

2. The smart card system according to claim 1, wherein the circuit is an integrated circuit.

3. The smart card system according to claim 2, wherein the integrated circuit further comprises:
    a microprocessor;
    a memory in communication with the microprocessor; and
    an input/output controller in communication with the processor.

4. The smart card system according to claim 1, wherein the power supply voltage ranges from about 3 volts to about 5.25 volts.

5. The smart card system according to claim 1, further comprising a magnetic stripe disposed on the rear portion of the smart card.

6. The smart card system according to claim 1, wherein the contact module is in physical electrical contact with the circuit.

7. The smart card system according to claim 1, wherein a depression is formed on the rear portion for receiving the contact module.

8. The smart card system according to claim 1, further comprising an optical transceiver disposed on the rear portion of the smart card.

9. The smart card system according to claim 1, wherein the smart card has physical dimensions of a conventional credit card.

10. The smart card system according to claim 9, wherein the physical dimensions of the smart card vary from about 85.47 mm to 85.72 mm in length, about 53.92 mm to 54.03 mm in width and about 0.70 mm and 0.90 mm in thickness.

11. The smart card system according to claim 9, wherein the physical dimensions of the smart card are about 85.60 mm length by 53.98 mm width by 0.80 mm thickness.

12. The smart card system according to claim 9, wherein the physical dimensions of the smart card vary from about 3.36" to 3.37" in length, about 2.12" to 2.13 in width and about 0.028" to 0.035" in thickness.

13. The smart card system according to claim 9, wherein the physical dimensions of the smart card are about 3.4" length by 2.1" width by 0.3" thickness.

14. The smart card system according to claim 1, wherein the front and rear portions are formed from plastic.

15. The smart card system according to claim 14, wherein the plastic is selected from the group consisting of ABS and PVC.

16. The smart card system according to claim 1, wherein the front portion has a surface area which is entirely available for receiving indicia.

17. The smart card system according to claim 1, further comprising:
a smart card reader for receiving the smart card and transferring information between the smart card reader and the smart card by way of the contact module disposed on the rear portion of the smart card.

18. The smart card system according to claim 17, wherein the smart card reader further comprises a contactless reader portion for wirelessly reading the smart card.

19. The smart card system according to claim 1, wherein the portable power supply generates electromagnetic energy for energizing the smart card.

20. The smart card system according to claim 19, wherein the electromagnetic energy is radiated from the portable power supply to the smart card.

21. The smart card system according to claim 19, wherein the portable power supply is enabled upon receiving an external electromagnetic signal.

22. The smart card system according to claim 1, wherein the portable power supply further comprises:
a battery ohmically detached from a smart card and a smart card reader,
an oscillator in communication with the battery; and
an antenna coupled to the oscillator.

23. The smart card system according to claim 22, wherein energy from the battery is wirelessly radiated to the smart card when the portable power supply receives a signal from the smart card.

24. The smart card system according to claim 23, wherein energy from the battery is wirelessly radiated to the smart card when the portable power supply receives a signal from the smart card reader.

25. The smart card system according to claim 22, further comprising a switch in communication with the battery, wherein the switch enables the wireless radiation of energy from the portable power supply to the smart card.

26. The smart card system according to claim 22, further comprising a housing with a retainer for receiving the smart card.

27. The smart card system according to claim 26, further comprising a latch mechanically coupled to the housing for receiving the smart card, wherein the portable power supply is enabled when the smart card is inserted in the latch.

28. A method for transacting information in a smart card system including a smart card and a smart card reader, comprising:
generating a first electromagnetic signal having a first frequency;
wirelessly radiating the first electromagnetic signal to the smart card tuned to the first frequency from a portable power supply ohmically detached from the smart card and the smart card reader;
transmitting a signal to the smart card by way of a contact module disposed on a rear portion of the contact smart card, wherein the smart card includes a front portion for displaying indicia and wherein the contact module and the front portion of the smart card are located on opposite sides of the smart card; and
initiating communication between the smart card and the smart card reader when the smart card is inserted in the smart card reader.

29. The method according to claim 28, wherein transmitting the signal includes transmitting the signal from the smart card reader.

30. The method according to claim 28, wherein transmitting the signal includes transmitting the signal from the portable power supply.

31. The method according to claim 28, further comprising:
receiving a second electromagnetic signal; and
enabling the wireless radiation of the first electromagnetic signal upon receiving the second electromagnetic signal.

32. The method according to claim 28, further comprising enabling the wireless radiation of the first electromagnetic signal upon receiving a signal from a switch contact closure.

* * * * *